United States Patent [19]

Hassan

[11] Patent Number: 4,805,886
[45] Date of Patent: Feb. 21, 1989

[54] JOUNCE BUMPER ASSEMBLY FOR VEHICLE SUSPENSION STRUT

[75] Inventor: Morris Hassan, Trenton, Mich.

[73] Assignee: Chrysler Motors Corporation, Highland Park, Mich.

[21] Appl. No.: 179,721

[22] Filed: Apr. 11, 1988

[51] Int. Cl.⁴ .............................................. F16F 13/00
[52] U.S. Cl. ..................................... 267/220; 267/33; 267/293; 280/668; 280/710
[58] Field of Search ................. 267/33, 140, 152, 153, 267/195, 219, 220, 258, 292, 293; 280/710, 712, 668

[56] References Cited

U.S. PATENT DOCUMENTS

| | | | |
|---|---|---|---|
| 3,412,990 | 11/1968 | Gladstone | 267/220 |
| 4,248,454 | 2/1987 | Cotter et al. | 280/668 |
| 4,434,977 | 3/1984 | Chiba et al. | 267/33 |
| 4,618,127 | 10/1986 | Le Salver et al. | 267/220 |
| 4,681,304 | 7/1987 | Hassan | 267/140 X |

Primary Examiner—George E. A. Halvosa

Attorney, Agent, or Firm—Edward P. Barthel

[57] ABSTRACT

An improved deflection jounce bumper assembly for a vehicle suspension strut which dampens and limits the action of the shock absorber in its jounce stroke. The bumper assembly comprises an inverted metal cup-shaped shell member which attaches a molded elastomeric bumper member to the strut upper mount. The bumper member has a lower hollow right cylindrical sleeve portion which surrounds the strut piston rod with the sleeve upper end in turn surrounded by an outer side wall portion of the shell member. The sleeve portion has a predetermined height such that upon its lower end face impacting on the strut support casing upper end closure plate an initially high spring dampening rate is achieved. A control ring is embedded in the sleeve portion adjacent its lower end face which, together with the shell member outer side wall is operative to restrict and control the expansion of the sleeve portion as it undergoes progressive spring rate deformation adjacent the full jounce position.

6 Claims, 2 Drawing Sheets

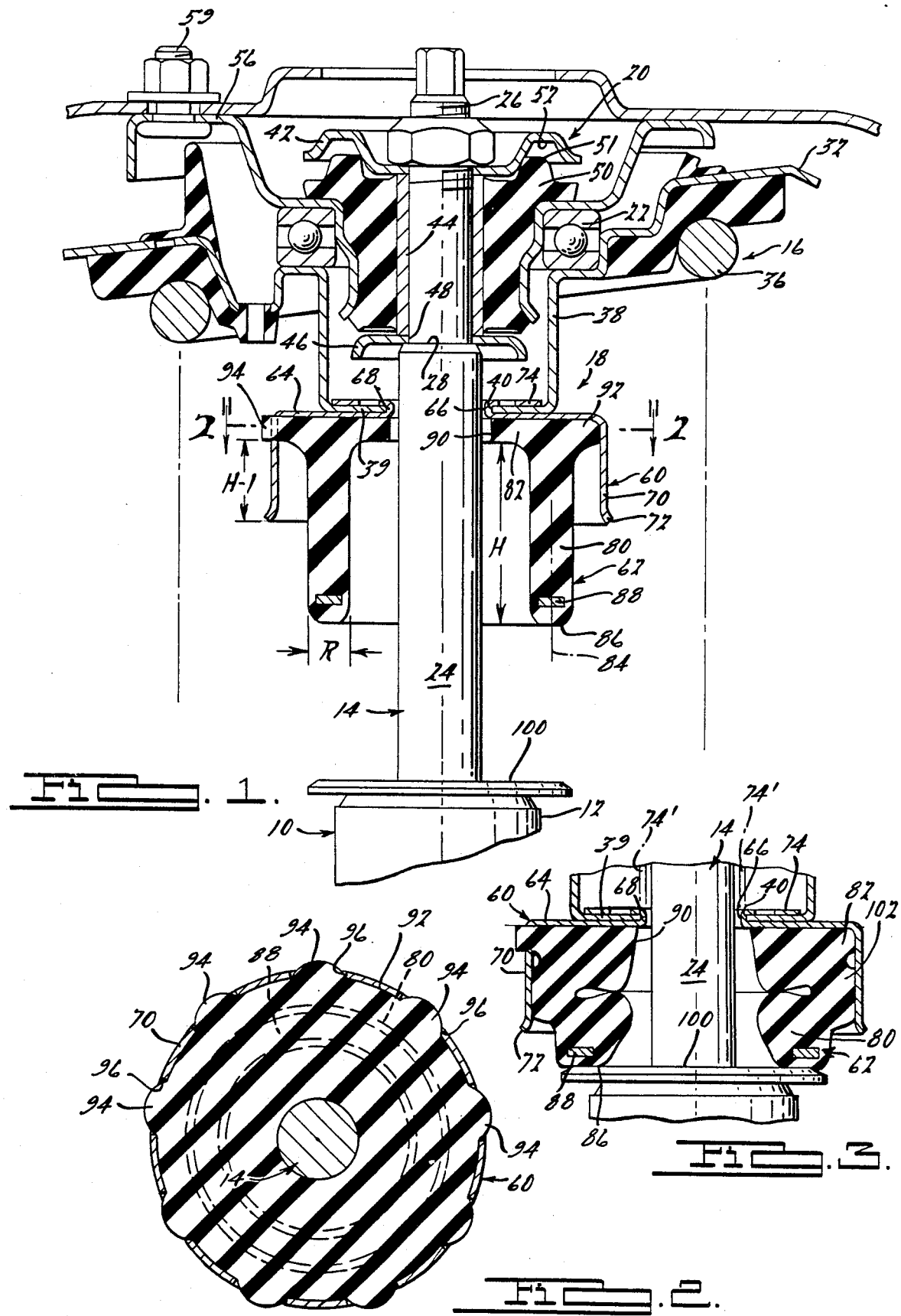

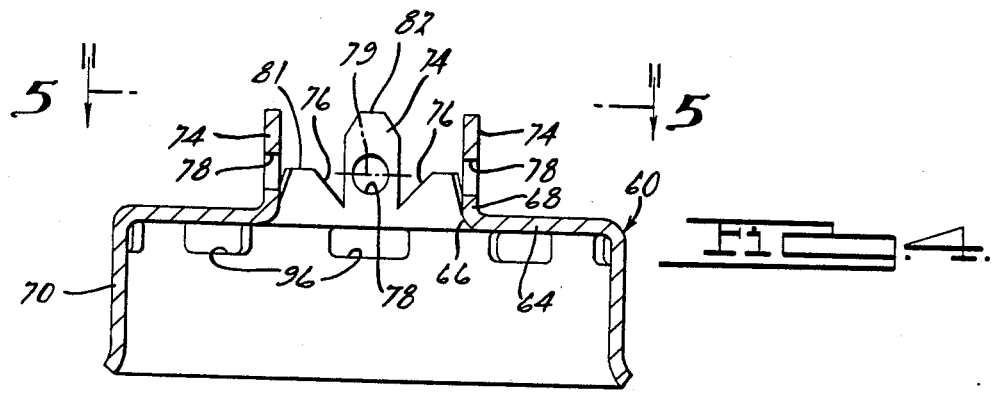
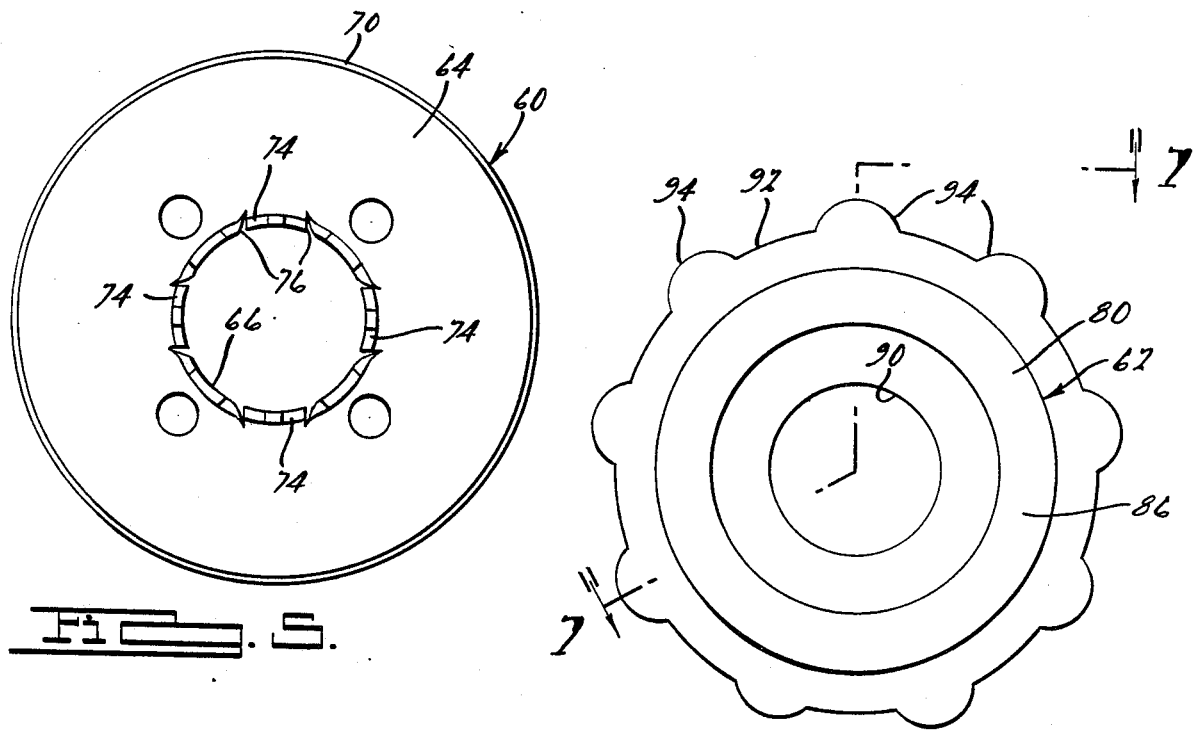
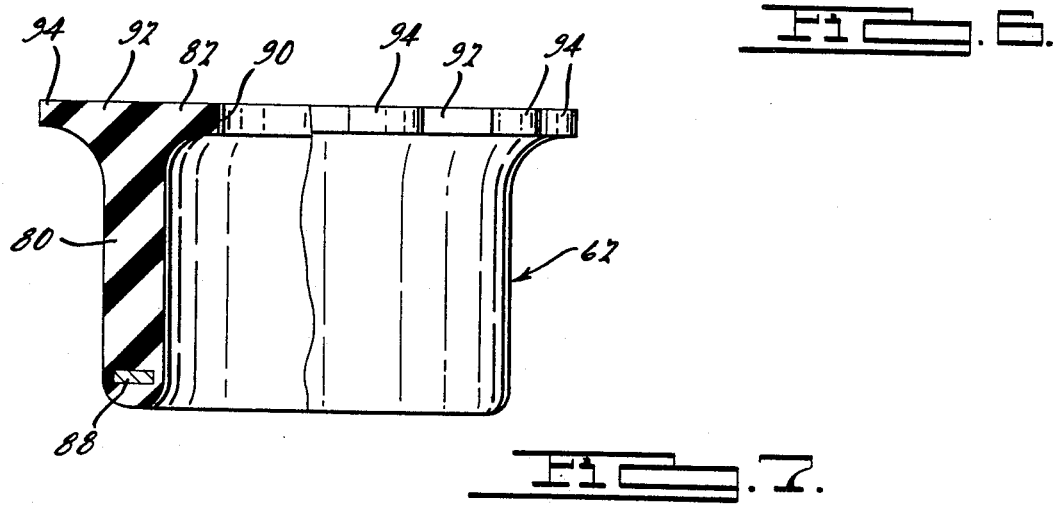

JOUNCE BUMPER ASSEMBLY FOR VEHICLE SUSPENSION STRUT

BACKGROUND OF THE INVENTION

This invention relates to automotive suspensions and more particularly to a jounce bumper assembly for a suspension strut providing a controlled spring rate.

The U.S. Pat. No. 4,681,304 issued July 21, 1987, to M. Hassan and entitled Deflection Jounce Bumper For Strut Suspension discloses a jounce bumper having initially high dampening load displacement resistance. A generally cylindrical shaped elastomeric bumper is provided having a solid upper hub portion encircling the strut piston rod. A lower impact portion of the Hassan bumper has outer and inner concentric wall portions defining an intermediate downwardly opening channel. The wall sections are interconnected by a plurality of integral column-like arcuate bridging segments defining therebetween an axial blind bore. Upon the bumper being impacted the wall sections together with the bridging segments stretch to absorb impact energy thereby achieving the initially high dampening load displacement resistance. The jounce bumper of the '304 patent is expensive to manufacture and has a limited service life.

The U.S. Pat. No. 4,434,977 issued Mar. 6, 1984 to Chiba et al. discloses a strut type suspension for a vehicle. The Chiba et al. patent is an example of a prior art jounce rubber bumper fitted onto the piston rod which functions to dampen and limit the action of the shock absorber during its jounce stroke.

SUMMARY OF THE INVENTION

It is an object of the present invention to provide a jounce bumper assembly for a motor vehicle suspension shock absorber mount apparatus having an outer casing and a piston rod extending out of the casing upper end wherein, the jounce bumper member of the assembly is adapted to impact the outer casing upper end during a jounce stroke so as to achieve both sufficiently high initial spring rates together with an overall minimal compressive height.

It is another object of the present invention to provide a jounce bumper assembly as set forth above which includes a cup-shaped member adapted to be connected to the mount apparatus and a cylindrical shaped hollow elastomeric sleeve member supported concentrically within the cup-shaped shell wherein the elastomeric sleeve member surrounds the piston rod upper end. Upon the sleeve member lower end face impacting on the casing upper end the sleeve member achieves an initially high spring dampening rate while the shell member operates to restrict the expansion of the elastomeric sleeve member as it undergoes progressive controlled deformation and compaction.

It is still another object of the present invention to provide a jounce bumper assembly as set forth above wherein the cup-shaped shell member outer side wall portion is formed with sleeve attachment means and the sleeve member upper end portion includes locking apertures adapted to readily engage the shell member attachment means providing a completed assembly.

It is a further object of the present invention to provide a jounce member assembly as set forth above wherein the shell member upper closed end wall portion is formed with a central passage defined by an upwardly extending cylindrical neck portion of a size and shape to closely fit within a strut mount aperture. The insert neck portion terminates in a plurality of upwardly extending tongues adapted to be inserted through a mount aperture and bent outwardly thereby readily securing the jounce bumper assembly to the strut mount.

It is still another object of the present invention to provide a jounce bumper assembly as set forth above wherein the elastomeric sleeve member lower impact end has control ring means embedded therein insuring a predetermined buckling pattern of the sleeve member in combination with the shell member side wall portion achieving increased damping adjacent the end of the piston rod jounce stroke thereby reducing ride harshness and noise.

These and other objects and features of the invention will become apparent to those skilled in the vehicle suspension arts upon reading the following detailed description with reference to the accompanying drawings in which:

BRIEF DESCRIPTION OF THE DRAWINGS

FIG. 1 is a front view, partly in section, of the upper portion of a vehicle suspension strut embodying the jounce bumper assembly of the present invention;

FIG. 2 is a vertical sectional view taken on the line 2—2 of FIG. 1;

FIG. 3 is a fragmentary view, partly in section, of the jounce bumper assembly in its maximum compressed mode;

FIG. 4 is an enlarged fragmentary detail front view of the metal cup-like shell member of the subject jounce bumper assembly;

FIG. 5 is a fragmentary top view taken on line 5—5 of FIG. 4;

FIG. 6 is a top elevational detail view of the elastomeric sleeve member; and

FIG. 7 is a vertical sectional view taken on the line 7—7 of FIG. 6.

DESCRIPTION OF THE PREFERRED EMBODIMENT

Referring now to FIG. 1 of the drawings, a suspension strut of the type generally employed, for example, in a MacPherson independent wheel suspension system is partially illustrated at 10. The suspension strut 10 comprises a tubular housing assembly having an outer support casing 12, a cylindrical piston rod member 14 received in the upper end of the casing 12, a helical suspension spring 16, jounce bumper assembly 18, a rebound bumper assembly 20, and a ball thrust bearing assembly 22.

The tubular housing assembly and the piston rod 14 cooperate in a known manner to function as a hydraulic spring action modifier in a vehicle suspension system. Adjacent the lower end of the housing assembly casing 12 is a mounting plate (not shown) whereby the strut 10 may be secured to the wheel assembly of a vehicle. Reference may be had to U.S. Pat. No. 4,256,292 issued Mar. 17, 1981 to Sullivan et al. for details of a typical strut mounting plate and vehicle road wheel. The disclosure of the '292 patent is hereby incorporated by reference herein.

FIG. 1 shows the piston rod 14 as including a lower smooth portion 24 telescopically received in the housing assembly outer casing 12 and an upper threaded portion 26. An upwardly facing shoulder 28 is formed between the lower and upper rod portions 24 and 26. A nut 30 is threadingly received on the upper threaded rod portion 26 for making portions of the helical spring 16, the jounce bumper assembly 18, and the rebound bumper assembly 20 axially fast against the shoulder 28.

The helical spring assembly 16 includes an upper canted spring seat member 32, having an elastomeric backing 34 bonded to the underside thereof, a lower spring seat member (not shown), and a helical spring 36. For details of a conventional lower spring seat member reference may be made to U.S. Pat No. 4,248,454 the disclosure of which is incorporated by reference herein.

The upper seat member 32 includes a downwardly extending cup-shaped portion 38 having a bottom or horizontal plate portion 39 formed with a central circular aperture 40 through which the piston rod portion 24 extents in a spaced concentric manner.

The rebound bumper assembly 20 includes an upper rebound retainer 42, a rebound bumper sleeve 44, and a lower rebound retainer 46. The lower rebound retainer 46 has an aperture 48 sized to permit assembly over the threaded rod portion 26 to the position abutting the shoulder 28. A rebound bumper ring 50 is formed on the sleeve 44 and presents an annular raised surface 51 for reception in inverted channel 52 formed in upper ring 42. The ball thrust bearing assembly 22 is positioned between rebound mounting plate 54 and the upper seat member 32. Flat outer flange 56 of the mounting plate 54 is secured to the vehicle body structure 58 by suitable fasteners such as the bolt and nut 59.

The jounce bumper assembly 18 of the present invention is in the form of an inverted cup-shaped shell member 60 supporting an elastomeric hollow sleeve member 62. The cup-shaped shell member, preferably stamped from sheet metal, comprises an upper closed end wall portion 64 formed with a central rod passage 66 defined by upwardly extending neck portion 68. The shell member 60 has an annular outer vertical or right cylindrical wall portion 70 the principal axis of which is coincident with the center of the passage 66. It will be noted that the wall portion 70 terminates in an outwardly radiused or rolled lip portion 72.

With reference to FIGS. 3 and 4 the neck portion 68 is formed with a plurality of integral axially extending tongues which in the disclosed embodiment comprise four tongues 74 lanced therefrom. The tongues 74 are equally spaced at ninety degree intervals around the neck portion 68 defining V-shaped slots 76 on either side thereof. As seen in FIG. 4 each of the tongues 74 is machined with a weakening or bending hole 78 located with its center on diametrical construction line 79 aligned substantially on the upper edges 81 of the neck portion 68 defined intermediate the tongues 74.

The shell member neck portion 68 is of a size and shape to closely fit within the lower mount bottom plate portion aperture 40 with the tongues 74 initially extending vertically as seen by dashed lines 74' in FIG. 3. The shell member 60 is thus readily secured to the mount lower seat portion 38 by bending the tongues 74 outwardly on a transverse line to their full-line positions 74 (FIG. 3) overlying lower seat bottom plate portion 39.

The jounce bumper assembly sleeve member 62 comprises a cylindrical shaped annular lower sleeve portion 80 and an upper cap portion 82 molded integral therewith from an elastomeric material. In the preferred embodiment the elastomeric material is natural rubber. As shown in FIG. 1 the lower sleeve portion 80 concentrically encircles the piston rod lower portion 24 in a radially spaced manner. The elastomeric material in the preferred embodiment is natural rubber and designed with a predetermined durometer number range dictated by the range of jounce forces to which the shock absorber 10 will be subjected. Further, the sleeve portion 80 has a predetermined uniform radial thickness "R" and axial height "H" conforming with the particular elastomeric material selected.

The sleeve portion 80 has its medial cylindrical axis, defined by construction line 84, positioned vertically substantially intermediate the shell outer wall portion 70 and the inner piston rod portion 24. It will be further noted that the height "H-1" of the shell side wall portion 70 is about one-half the height "H" of the lower sleeve portion 80.

Circular retaining ring means is shown embedded in the sleeve portion 80 adjacent its lower end face 86. In the disclosed embodiment the retaining ring means is a single metal washer-like flat ring 88 concentrically molded or embedded within the sleeve portion 80 adjacent its lower end face 86.

As best seen in FIGS. 2, 6 and 7 the sleeve member 62 upper cap portion 82 has a central aperture 90 sized to provide free clearance to receive the piston rod lower portion 24 therethrough. The cap portion 82 is formed around its outer periphery with a terminal flange 92 having a predetermined maximum diameter of a dimension slightly less than the internal diameter of the shell member side wall portion 70 for slidable reception in the shell member lower open end. The shell member rolled lip portion 72 is provided for ease of entry by the cap portion 82.

FIG. 2 shows the cap portion periphery formed with a plurality of semi-circular or half-round protrusions or tabs 94 integrally molded therein. In the disclosed embodiment a total of nine tabs 94 are shown equally spaced around the cap portion terminal flange 92. The shell member side wall portion 70 is shown in FIG. 4 formed with a plurality of slots 96 arranged uniformity so that each slot receives therethrough an associated locking tab 94. It will be noted that the locking tabs 94 are flexibly received in their respective slots 96 by virtue of the tabs 94 being compressed radially inwardly during relative axial movement between the shell and sleeve members 60 and 62, respectively. This inward flexibility of the tabs 94 is assisted by the cap portion central aperture 90 providing a compressible clearance intermediate the aperture 90 and the piston rod.

Thus, in operation during severe jounce strokes the shock absorber support casing upper end cover plate, shown at 100 in FIG. 2, initially impacts the lower end face 86 of the sleeve portion. This initial impact is substantially absorbed by the column effect of the sleeve portion 84 assisted by the embedded control ring 88 providing a high initial spring or load/deflection rate and thus high early dampening of the shock jounce load. As a result there is minimal axial travel of the piston rod 14. Thus, a minimal compressed height is achieved by the jounce bumper assembly 18 to smoothly absorb the impact energy of the shock loads.

Upon the sleeve portion 80 being further compressed it achieves a substantially uniform spring rate. This results because as the elastomeric sleeve portion 80 is stressed it loses its column-like shape and tends to buckle outwardly at an intermediate section, as seen at 102 in FIG. 3. Such outward buckling is restricted in a controlled manner by the shell outer wall portion 70. It will be appreciated that the control ring 88 insures the predetermined buckling pattern shown by preventing radial movement of the sleeve lower end 86. Further, the service life of the jounce bumper assembly is greatly enhanced.

While a preferred embodiment has been shown and described to illustrate the invention, other embodiments will become to those skilled in the art. Accordingly, the scope of his invention is set forth in the following claims.

What is claimed is:

1. A jounce bumper assembly for a vehicle suspension strut comprising a shock absorber having an outer support casing and a piston rod extending out of the casing upper end cover plate, means connecting said casing to the vehicle unsprung mass, an upper mount connecting the upper end of said piston rod to the vehicle sprung mass, said upper mount including a transverse portion having a central aperture therein receiving said piston rod therethrough in a spaced concentric manner, and means connecting the upper end of said piston rod to said sprung mass, said jounce bumper assembly comprising:

a rigid inverted cup-shaped shell member and a molded flexible elastomeric sleeve member;

said cup-shaped shell member having a transverse upper closed end portion and a right cylindrical shaped outer side wall portion concentric with said piston rod;

said shell member upper closed end portion formed with an upwardly extending neck portion of an external size and shape to closely fit within said upper mount aperture;

said neck portion defining an internal piston rod passage including locking means adapted for retaining said shell neck portion within said mount aperture;

said shell side wall portion formed with a plurality of slots positioned adjacent its upper closed end;

said elastomeric sleeve member defining a cylindrical shaped annular hollow lower sleeve portion and an upper cap portion, said lower sleeve portion concentrically encircling the piston rod and radially spaced intermediate said shell member cylindrical side wall portion and said piston rod;

said sleeve portion having control ring means embedded therein adjacent its lower end;

said sleeve member upper cap portion formed with a central aperture receiving said piston rod therethrough, said cap portion molded with a plurality of integral resilient locking tabs around its outer periphery, each said locking tab sized for reception in an associated aligned slot such that upon said piston rod being inserted through said cap portion central aperture said sleeve member cap portion is positively retained in said shell member;

said sleeve portion defining a predetermined height such that its lower end face is positioned a determined axial distance above the casing upper end cover plate with said strut in its neutral vehicle height position;

whereby upon said sleeve portion lower end face being initially impacted the resulting impact is substantially absorbed by the column effect of said sleeve portion assisted by said embedded control ring means providing a high initial spring rate and thus high early damping of the shock jounce strokes with minimal axial compression travel of the piston rod; and upon said sleeve portion being further compressed the resultant stress causes an intermediate portion of said sleeve to buckle outwardly, wherein such outward movement is restricted in a controlled manner by said shell member cylindrical outer side wall thereby achieving increased damping adjacent the end of said piston rod jounce stroke.

2. The jounce bumper assembly as set forth in claim 1, wherein said elastomeric material is rubber.

3. The jounce bumper assembly as set forth in claim 1, wherein said sleeve portion having a height about twice the height of said shell side wall portion.

4. The jounce bumper assembly as set forth in claim 1, wherein said control ring means in the form of a single flat washer-like ring.

5. The jounce bumper assembly as set forth in claim 1, wherein said locking means in the form of a plurality of attaching tongues extending vertically upwardly through said mount aperture to be bent upon a transverse line outwardly to overlie said mount seat member portion thereby fixedly retaining said shell neck portion within said mount aperture.

6. The jounce bumper assembly as set forth in claim 5, wherein each said attaching tongue having a weakening hole formed therein allowing ready outward bending of said tongues.

* * * * *